(12) United States Patent
Schreiber

(10) Patent No.: US 8,026,699 B2
(45) Date of Patent: Sep. 27, 2011

(54) FREQUENCY CONVERTER FOR A DOUBLE-FED ASYNCHRONOUS GENERATOR WITH VARIABLE POWER OUTPUT AND METHOD FOR ITS OPERATION

(75) Inventor: Dejan Schreiber, Nürnberg (DE)

(73) Assignee: Semikron Elektronik GmbH & Co. KG, Nuremberg (DE)

( * ) Notice: Subject to any disclaimer, the term of this patent is extended or adjusted under 35 U.S.C. 154(b) by 682 days.

(21) Appl. No.: 12/070,168

(22) Filed: Feb. 14, 2008

(65) Prior Publication Data

US 2008/0203978 A1    Aug. 28, 2008

(30) Foreign Application Priority Data

Feb. 14, 2007    (DE) ................... 10 2007 007 286

(51) Int. Cl.
H02P 9/00    (2006.01)
H02P 9/10    (2006.01)
(52) U.S. Cl. ........................ 322/44; 322/59
(58) Field of Classification Search .............. 322/29, 322/89, 59, 44, 19, 28; 363/68, 71, 37
See application file for complete search history.

(56) References Cited

U.S. PATENT DOCUMENTS

| | | | |
|---|---|---|---|
| 5,019,952 A * | 5/1991 | Smolenski et al. ........... 363/16 |
| 6,680,856 B2 | 1/2004 | Schreiber | |
| 6,750,633 B2 | 6/2004 | Schreiber | |
| 7,012,409 B2 | 3/2006 | Schreiber et al. | |
| 7,015,595 B2 | 3/2006 | Feddersen et al. | |
| 7,291,937 B2 * | 11/2007 | Willisch et al. .......... 290/44 |
| 7,728,562 B2 * | 6/2010 | Kajouke et al. ........... 323/222 |
| 2003/0151259 A1 | 8/2003 | Feddersen et al. | |
| 2003/0155893 A1 * | 8/2003 | Schreiber ................. 322/12 |
| 2003/0202367 A1 * | 10/2003 | Schreiber ................. 363/72 |
| 2006/0238929 A1 * | 10/2006 | Nielsen ................. 361/20 |
| 2006/0273766 A1 * | 12/2006 | Kawamura ............... 322/46 |
| 2008/0150285 A1 * | 6/2008 | Pereira et al. ............ 290/44 |

FOREIGN PATENT DOCUMENTS

| | | |
|---|---|---|
| DE | 103 34 051 | 2/2005 |
| EP | 1 244 203 | 9/2002 |
| EP | 1 313 206 | 5/2003 |
| WO | WO 2004/025823 | 3/2004 |

* cited by examiner

Primary Examiner — Julio Gonzalez
(74) Attorney, Agent, or Firm — Roger S. Thompson

(57) ABSTRACT

A frequency converter circuit for a double-fed asynchronous generator with a variable power output, which can be connected to a voltage network contains a rotor rectifier, which can be connected to the rotor of the asynchronous generator, a network frequency converter, which can be connected to the voltage network, and an intermediate circuit. The intermediate circuit contains a semiconductor switch arranged on the rotor rectifier, an intermediate circuit capacitor arranged on the network frequency converter, and a diode arranged between the semiconductor switch and the intermediate circuit capacitor. According to a method for operating such a frequency converter circuit, the semiconductor switch is kept closed during the sub-synchronous operation of the asynchronous generator, and during at least some periods of synchronous or super-synchronous operation of the asynchronous generator the semiconductor switch is opened.

9 Claims, 1 Drawing Sheet

FREQUENCY CONVERTER FOR A DOUBLE-FED ASYNCHRONOUS GENERATOR WITH VARIABLE POWER OUTPUT AND METHOD FOR ITS OPERATION

BACKGROUND OF THE INVENTION

1. Field of the Invention

The invention relates to a frequency converter circuits for use with wind power generating equipment and, more particularly, to such a circuit for a double-fed asynchronous generator with a variable power output, which can be connected to a voltage network, and a method for operating such a frequency converter circuit.

2. Description of the Related Art

Asynchronous generators with variable power output are widely used today in the field of energy generation. In particular, they are employed in connection with wind power generators, whose power output naturally greatly varies with the prevailing wind. A variable operating speed is of great advantage in connection with such asynchronous generators. A wind power generator with variable speed does permit better utilization of weak winds and exerts less mechanical stress on the tower of the wind power generator in strong winds.

A frequency converter circuit is required between an asynchronous generator and the voltage network for operating the former, into which the asynchronous generator is intended to feed energy. Frequency converter circuits for double-fed asynchronous generators in windmills are widely known and, as a rule, have a three-phase current frequency converter at the rotor side, intermediate circuit capacitors and a frequency converter on the network side. Such a classic frequency converter circuit for a double-fed asynchronous generator provides the two above mentioned advantages, but is comparatively expensive.

A simple solution regarding the double-fed asynchronous generator is known from U.S. Pat. No. 7,015,595, which offers a speed regulation in the sub-synchronous range. In this case "sub-/super-synchronous" refers to the so-called synchronous number of revolutions, or nominal rated speed of the asynchronous generator and means a number of rotor revolutions smaller/greater than the synchronous number of revolutions. The energy yield at low wind speeds is increased because of this. However, in case of a sudden increase in the wind speed, the windmill tower is not relieved.

A solution for windmills with an asynchronous generator with a short-circuited rotor and power electronic drive for smaller outputs and with an improved energy yield at low wind speeds is known from U.S. Pat. No. 7,012,409. Here, too, the windmill tower is not relieved in case of strong increases in wind speed.

An alternative option for tower relief is known from the prior art. Here, a resistor, which is switched on in case of higher wind speeds, is been inserted into the rotor circuit. Then the rotor current flows through the resistor. By means of this, the rotational speed of the windmill can be increased, additional wind energy is stored as additional kinetic energy of the windmill and the tower is mechanically relieved. Since the tower is mechanically relieved, the tower structure can be provided in a simpler and more cost-effective way. The "optislip" circuit with a resistor is completely retained in the rotor, or rotates along with it. Therefore no contact rings are provided. The rotor energy additionally heats the resistor, and therefore the rotor, and thus the generator. In actual use, the super-synchronous operation is briefly limited here to a few percent.

SUMMARY OF THE INVENTION

It is an object of the instant invention to provide an improved frequency converter circuit for an asynchronous generator having variable power output.

Briefly stated, there is provided a frequency converter circuit for a double-fed asynchronous generator, in particular a wind power generator, of variable power output, whose stator can be connected to a voltage network. The frequency converter circuit is comprised of a rotor rectifier, which can be connected to the rotor of the asynchronous generator and has two d.c. voltage outputs, and a network frequency converter, which can be connected to the voltage network and has two d.c. voltage inputs. The frequency converter circuit furthermore contains an intermediate circuit, which connects respectively one of the d.c. voltage outputs with one of the d.c. voltage inputs. The intermediate circuit has a semiconductor switch arranged between the d.c. voltage outputs and an intermediate circuit capacitor arranged between the d.c. voltage inputs. The intermediate circuit furthermore contains a diode arranged in one of the connecting lines between the semiconductor switch and the intermediate circuit capacitor.

Thus, the rotor windings of the rotor providing alternating voltage are conducted via contact rings to the rotor rectifier, as a rule a diode rectifier. The latter converts the alternating voltages, or currents, coming from the rotor to a direct voltage between the direct voltage outputs. This rectified voltage can be short-circuited by means of the semiconductor switch. The asynchronous generator behaves like a generator with a short-circuited rotor. Thus, the inverter located in the direction toward the voltage network is separated from the generator side, or the rotor, because the diode is polarized to be non-conducting, i.e. in the opposite direction.

The super-synchronous range of the generator has been expanded by means of the solution in accordance with the invention, since the excess output is not dissipated in a resistor, but instead is fed into the voltage network. In this case, the required diodes in the rectifier are more cost-effective in comparison with the known solutions containing a rotor frequency converter on the generator side. The entire solution is clearly cheaper than a corresponding structural step of reinforcing the windmill tower.

Normally an asynchronous generator, in particular in a windmill, with a short-circuited rotor is started by means of a soft-starter arrangement (W3C). No soft-starter arrangement is necessary for the frequency converter circuit. In fact, the asynchronous generator, or wind power generator, is started in a simple manner. The rectified rotor current can be controlled by means of the semiconductor switch and the rotor energy can be transferred in a controlled manner to the intermediate circuit. Then the inverter further feeds this energy into the voltage network. In this case, the wind power generator starts as if it had a rotor resistor, only that the energy then is not dissipated in a resistor, but is fed back into the network.

The windmill can also be started in another way, namely when the network frequency converter is connected to a network and the intermediate circuit capacitor is charged. Then the intermediate circuit voltage at the intermediate circuit capacitor, or between the direct voltage inputs or the direct voltage outputs of the rectifier, is higher than the network voltage, or its peak value, and amounts to, for example, approximately 1050 V for a network voltage of 3×690 V. In this case, the stator windings of the asynchronous generator are not connected to the network. The wind accelerates the generator when it idles. When the generator speed approaches synchronous speed, the stator winding connects to the network. In the course of this, the semiconductor switch operating as a rotor short-circuiting device, always remains open, i.e. is non-conducting.

The frequency converter circuit in accordance with the invention is cost-efficient, makes possible the super-synchronous speed of the generator and the relief of the tower structure of wind power installations. Variable speeds are possible in the super-synchronous range.

One of the connecting lines can contain a discrete choke, which is switched in series with the diode and arranged between the semiconductor switch and the direct voltage outlets. In cooperation with the choke, the semiconductor switch and the intermediate circuit capacitor operate in the manner of a step-up converter for the voltage provided by the rotor of the asynchronous generator after it has been rectified. The current flowing in the intermediate circuit is maintained in this way by the choke, in particular in the course of opening the semiconductor switch. However, for operating the circuit as a step-up converter, for example, it is alternatively possible to only use the choke, which is always present, in the asynchronous generator (rotor), provided the dimensioning allows this.

The nominal voltage at the rotor of the asynchronous generator can be higher than the nominal voltage of the stator. In particular, it can be at least twice and up to four times as high. In this case, the rotor windings are designed, for example, for the higher voltage, for example double or quadruple the voltage of the armature windings.

If, for example, the rotor winding of the asynchronous generator is designed for twice the voltage of the armature winding, in case of a 10% super-synchronous slippage of the asynchronous generator the rotor voltage is equal to 20% of the network voltage. If the rotor speed reaches 50% slippage, the rotor voltage is 100%, i.e. in the above example approximately 3×690 V at 25 Hz. This voltage, even its peak value, is still less than the intermediate circuit voltage of 105 V, so that the rotor current cannot yet flow out of the rotor into the intermediate circuit capacitor and therefore into the voltage network. Here the above mentioned step-up converter is required in order to charge the intermediate circuit capacitor from the rotor. Thus, for a voltage ratio between rotor and stator of two, the minimum rotor speed at which the stator, or the armature windings, can be switched into the network is approximately 50% of the synchronous speed.

If the stator is connected to the voltage network and the rotor voltage is less than the intermediate circuit voltage, the asynchronous generator continues to accelerate and the induced rotor voltage becomes less and less the higher the speed becomes, or the closer it approaches the synchronous speed.

If finally the rotor voltage approaches zero when the synchronous speed is reached, the semiconductor switch is switched on, i.e. short-circuited. The asynchronous generator then behaves like an asynchronous generator with a short-circuited rotor. The asynchronous generator maintains this behavior as long as the semiconductor switch is conducting.

If the semiconductor switch is briefly shut off, the rectified rotor current continues to flow in the intermediate circuit. If now the force of the wind suddenly increases, the asynchronous generator can accelerate in this way.

The asynchronous generator can be laid out for two different synchronous speeds (nominal number of revolutions), for example for 1000 rpm and 1500 rpm. In that case a super-synchronous speed regulation can be employed for both speeds. The regulation range is clearly greater for lower speeds than for higher speeds. The generator output is substantially smaller at low synchronous speeds and therefore the permissible rectified rotor output as an impressed value of the rectifier is larger in relation to this. In this way, the regulating properties for low synchronous speeds are substantially more far-reaching.

For example, for a 1 MW generator of nominally 1500 rpm, the actually delivered output at rpm n=1000 is equal to 296 kW because of $1000^3/1500^3$. If the rotor rectifier output is laid out for 20% of the generator output (200 kW), the maximal speed is 20% higher, i.e. maximum number of rpm of n=1800 is permitted. However, for the lower nominal number of rpm, i.e. n=1000 and the nominal output of 296 kW, the dynamic speed increase at 2000 kW is 59.9%, i.e. considerably higher than 20%. For this reason the adaptability of the asynchronous generator, or of the windmill, to low wind speeds is very flexible, and the energy yield at low speeds is considerably greater than with windmills with constant nominal rpm.

In regard to the method, the object is attained by a method for operating a frequency converter circuit as explained above, in which the semiconductor switch is maintained closed during the sub-synchronous operation, and the semiconductor switch is opened, at least during periods of time, during the synchronous and super-synchronous operation of the asynchronous generator.

The regulating method is simple. When the semiconductor switch is opened for a short time, i.e. is switched to be non-conductive, the rectified rotor current continues to flow into the intermediate circuit capacitor, in particular in case of the employment of the above mentioned discrete choke. The voltage in the intermediate circuit capacitor would increase, but the network frequency converter discharges the intermediate circuit capacitor and keeps the intermediate circuit voltage constant. Therefore the energy from the rotor of the asynchronous generator flows into the voltage network. This is the so-called DFIG (double-fed induction generator) principle. In this case, the longer the semiconductor switch is opened during the switching period, the higher the rotor voltage becomes, and the greater the delivered energy. The rotor speed also increases because of this, and so the windmill feeds energy through the stator windings and rotor windings into the voltage network; the DFIG principle is employed.

Even if the diode blocks, or the asynchronous generator is stopped, the inverter continues to be connected to the network side and can remain in operation. This makes possible an idle power compensation, network voltage regulation or cos(φ) regulation. In this case, depending on the requirements, the inverter can deliver capacitive or inductive idle power to the voltage network and therefore keep the output factor of the generator in the vicinity of 1, and/or can stabilize the network voltage as needed. The production of capacitive idle power increases the network voltage, picking up inductive idle power lowers the network voltage.

Otherwise, the method in accordance with the invention has already been explained in connection with the frequency converter circuit in accordance with the invention.

Reference is made to the exemplary embodiments in the drawings regarding a further description of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the

DETAILED DESCRIPTION OF THE PRESENTLY PREFERRED EMBODIMENTS

Figure 1:
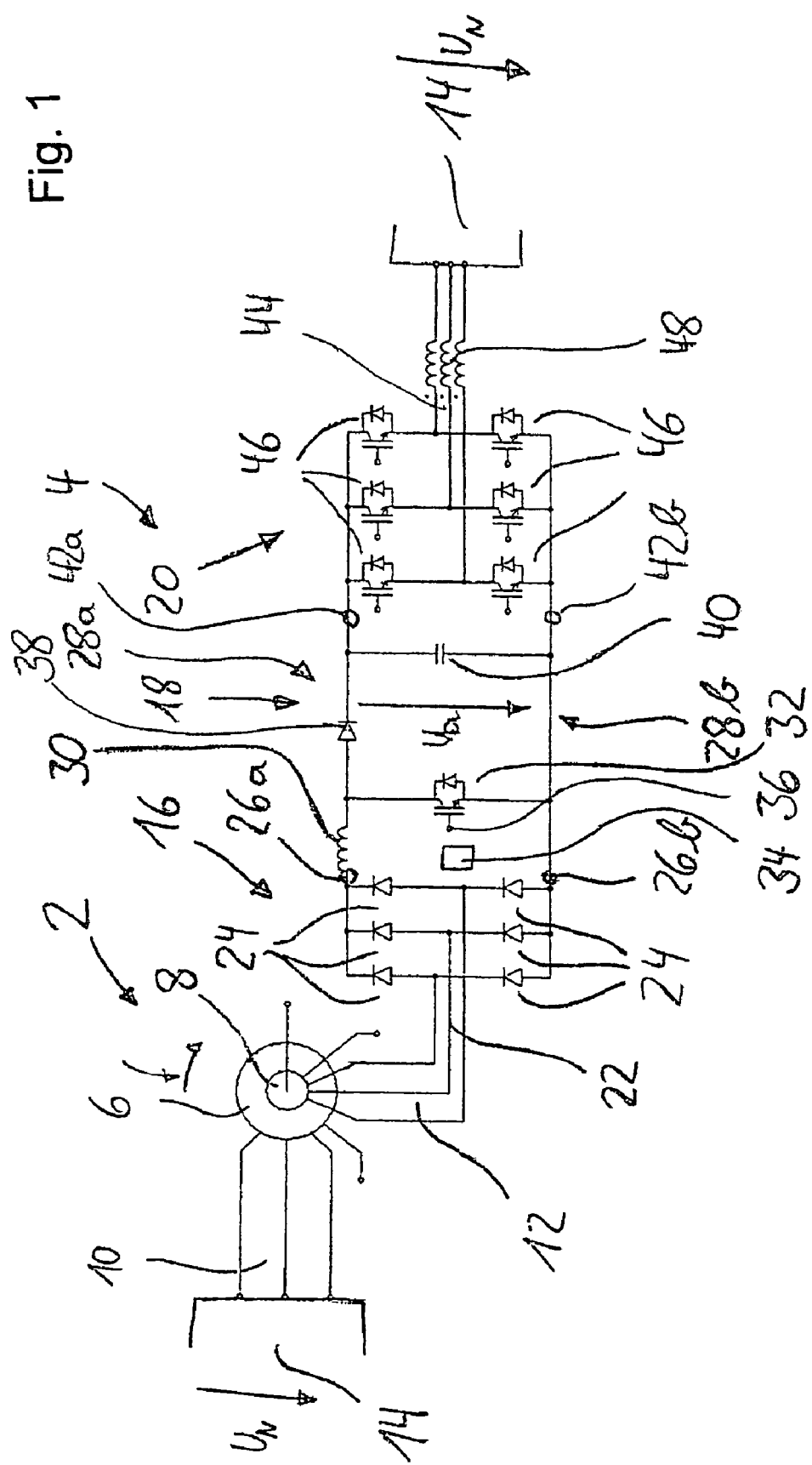
FIG. 1 is a schematic representation of an asynchronous generator of a wind power installation with a frequency converter circuit in accordance with the invention.

An asynchronous generator 2 of a wind power installation, not shown, having an associated frequency converter circuit 4, is represented in FIG. 1. The asynchronous generator 2 is comprised of a stator 6 and a rotor 8, which have, respectively, stator connectors 10 and rotor connectors 12. Stator connectors 10 are connected to a voltage network 14 of a nominal voltage $U_N \approx 3 \times 690$ V. Rotor 8, driven by means of a non-represented windmill and a gear of the wind power generator, is connected by means of its rotor connectors 12 with frequency converter circuit 4. Asynchronous generator 2 operates at two different synchronous speeds $n_{s1,2}$: approximately 1000 rpm and approximately 1500 rpm.

Essentially, frequency converter circuit 4 contains three partial circuits: a rectifier 16, an intermediate circuit 18 and an inverted rectifier 20. Rectifier 16 has alternating voltage inputs 22, which are connected with rotor connectors 12 of asynchronous generator 2 and via which alternating voltage, or alternating current, is transmitted from rotor 8 to rectifier 16. In rectifier 16, alternating voltage inputs 22 are interconnected in a known manner via diodes 24 with direct voltage outputs 26a, b.

Intermediate circuit 18, or step-up converter, is connected to direct voltage outputs 26a, b, specifically with its two linear branches 28a, b. A choke 30, which is connected with the direct voltage output 26a, is arranged in linear branch 28a, followed by an IGBT 32, which connects linear branches 28a, b. IGBT 32 acts as an electronically controllable semiconductor switch, which therefore can short-circuit linear branches 28a, b at its input 36 by means of an appropriate switching signal 34. A diode 38 arranged in the passage direction follows choke 30 and the connector of the IGBT in linear branch 28a, and in turn is followed by an intermediate circuit capacitor 40, which connects linear branches 28a, b.

Direct voltage inputs 42a, b of inverted rectifier 20 follow intermediate circuit capacitor 40. Inverted rectifier 20 contains IGBTs 46, which are interconnected in a known manner between direct voltage inputs 42a, b and alternating voltage outputs 44. In turn, alternating voltage outputs 44 are connected with voltage network 14 via voltage (filter) chokes 48.

The intermediate circuit voltage $U_{DC}$ at intermediate circuit capacitor 40 amounts to approximately 1050 V for $3 \times 690$ V networks. During sub-synchronous operations, when the number of revolutions n of rotor 8 lies below the nominal number of revolutions, or of the lesser synchronous number of revolutions or speed $n_{s1}$ of approximately 1000 rpm, the IGBT 32 remains continuously closed, i.e. the linear branches 28a, b remain electrically connected, so that direct current voltage outputs 26a, b of rectifier 16 are electrically connected, and rotor connectors 12, and therefore rotor 8, are also short-circuited via rectifier 16.

IGBT 32 is opened starting at the synchronous speed of the rotor 8, so that rotor connectors 12 are no longer short-circuited and instead the electrical energy coming from rotor 8 is rectified in rectifier 16 in the form of direct voltage or direct current and is fed via direct voltage outputs 26a, b into linear branches 28a, b of intermediate circuit 18. There, the current charges intermediate circuit capacitor 40 via diode 38. As soon as intermediate circuit capacitor 40 is overcharged, it can be discharged again into the network 14 via inverted rectifier 20 and in this way electrical energy can be fed back from rotor 8 into network 14.

If the voltage between the direct voltage outputs 26a, b is not sufficient for this, IGBT 32 can be triggered in a known manner so that it acts, together with choke 30, diode 38 and intermediate circuit capacitor 40, in the manner of a step-up converter to pump the rectified voltage coming from rotor 8 up to the level of intermediate circuit voltage $U_{DC}$.

Thus, when operated as a step-up converter, IGBT 32 is opened and closed over periods of time by means of appropriate switching signals 34, for example at a customary switching frequency of a step-up converter of from approximately 1 to approximately 10 kHz. In the course of the operation, the step-up converter therefore works between the synchronous frequency, i.e. when the number of rotor revolutions n approximately corresponds to the synchronous speed $f_{s1}$, and an approximately 20% super-synchronous number of rotor revolutions $n \approx 1.2 \times n_{s1}$.

The maximum speed of asynchronous generator 2 is limited by the output of frequency converter circuit 4. If, for example, the maximum rotor frequency converter output is 20% of the nominal output of the generator, the maximum windmill speed is limited to 1.063-times of the synchronous speed, or the number of revolutions $N_e$, i.e. is about 6.3% higher than the synchronous speed. In that case, since $1.063^3 \approx 1.2$, the windmill output amounts to approximately 12% of the nominal generator output. If asynchronous generator 2 is connected in the configuration for low numbers of revolution (lower synchronous speeds), the relative speed increase is greater. At half the nominal wind speed, i.e. half the synchronous speed $n = \frac{1}{2} N_s$, the available wind output is $(0.5n)^3/n^3 = \frac{1}{8} = 12.5\%$ of the nominal output. Thus the wind speed regulation range is 50% to 69%, the output regulation range 12.5% to 32.5%.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A frequency converter for a double-fed asynchronous generator having a rotor, a stator and a variable power output, and which can be connected to a voltage network, the frequency converter comprising:

a rotor rectifier, adapted to be connected to the rotor of the asynchronous generator, said rotor having two direct voltage outputs;

a network frequency converter, adapted to be connected to the voltage network;

two direct voltage inputs; and an intermediate circuit, which can be connected to each direct voltage input via a first connecting line;

wherein said intermediate circuit contains a semiconductor switch disposed between the direct voltage outputs, an intermediate circuit capacitor disposed between said direct voltage inputs, second and third connecting lines connecting said semiconductor switch and the intermediate circuit capacitor and a diode disposed in one of said connecting lines; and wherein a nominal voltage at the rotor is higher than a nominal voltage at the stator.

2. The frequency converter of claim 1, wherein the asynchronous generator is capable of operating at more than one synchronous speed.

3. The frequency converter of claim 1, wherein one of said connecting lines includes a choke, which is switched in series with said diode and is disposed between said semiconductor switch and the direct voltage outputs.

4. The frequency converter of claim 3, wherein the asynchronous generator is capable of operating at more than one synchronous speed.

5. The frequency converter of claim 3, wherein the nominal voltage at the rotor is from approximately twice to approximately four times higher than the nominal voltage at the stator.

6. The frequency converter of claim 5, wherein the asynchronous generator is capable of operating at more than one synchronous speed.

7. The frequency converter of claim 1, wherein the nominal voltage at the rotor is from approximately twice to approximately four times higher than the nominal voltage at the stator.

8. The frequency converter of claim 1, wherein the asynchronous generator is capable of operating at more than one synchronous speed.

9. A method for operating a frequency converter for a double-fed asynchronous generator having a rotor, a stator and a variable power output, and which can be connected to a voltage network, the frequency converter comprising:

a rotor rectifier, adapted to be connected to the rotor of the asynchronous generator, said rotor having two direct voltage outputs;

a network frequency converter, adapted to be connected to the voltage network:

two direct voltage inputs; and an intermediate circuit, which can be connected to each direct voltage input via a first connecting line;

wherein said intermediate circuit contains a semiconductor switch disposed between the direct voltage outputs, an intermediate circuit capacitor disposed between said direct voltage inputs, second and third connecting lines connecting said semiconductor switch and the intermediate circuit capacitor and a diode disposed in one of said connecting lines, wherein the method comprises the steps of:

closing said semiconductor switch during sub-synchronous operation of the asynchronous generator, and opening said semiconductor switch during at least portions of synchronous or super-synchronous operation of the asynchronous generator; and wherein the network frequency converter is operated while the asynchronous generator is not in operation.

* * * * *